United States Patent Office 3,761,265
Patented Sept. 25, 1973

3,761,265
TREATING IMAGEWISE DISTRIBUTION OF DE-
COMPOSED PEROXY COMPOUNDS IN THE
PRESENCE OF DYE-FORMING MATERIALS
AND DYE-INTENSIFYING MATERIALS OF
ALCOHOLS AND KETONES
Reinhart Matejec, Rudolf Meyer, and Erwin Ranz, Lever-
kusen, Germany, assignors to Agfa-Gevaert Aktien-
gesellschaft, Leverkusen, Germany
No Drawing. Filed Sept. 8, 1971, Ser. No. 178,842
Claims priority, application Germany, Sept. 11, 1970,
P 20 44 993.8
Int. Cl. G03c 1/58, 5/24, 7/00
U.S. Cl. 96—48 R    4 Claims

ABSTRACT OF THE DISCLOSURE

In a process for the production of photographic images by imagewise exposure of light-sensitive layers to imagewise produce nuclei that catalytically decompose peroxy compounds, wherein the exposed layer is treated with a peroxy compound and with reaction components for a dye-forming oxidation reaction that produces the photographic image, the improvement according to which the treatment is also with an organic compound having at least one aliphatic hydroxyl group and/or an aliphatic or aromatic ketone, to intensify the dye image.

This invention relates to an improved process for the production of photographic images by the imagewise decomposition of peroxy compounds, the image being made visible by a chemical process utilizing the catalytically decomposed peroxy compound for a dyestuff-forming oxidation reaction.

The production of photographic images by the imagewise production of substances which catalyze the decomposition of peroxy compounds is known per se. In the present context catalytic decomposition is the catalytic activation of the peroxy compound required for the dyestuff-forming oxidation reaction. In this process, a light-sensitive layer is exposed imagewise, accompanied by the imagewise production of nuclei of a noble metal of Group Ib or VIII of the Periodic Table, after which this layer is treated with a peroxy compound which decomposes catalytically on the nuclei, in the presence of reaction components for a dye-forming oxidation reaction.

Instead of light-sensitive layers which, on exposure to light, form noble metal nuclei for the decomposition of peroxy compounds, it is also possible to use layers containing substances which, on exposure to light, form catalase-active or peroxidase catalysts. Examples of such substances include complex compounds of heavy metals of Group VIb or VIII of the Periodic Table with a monobasic or polybasic carboxylic acid or other ligands. Compounds from which iodine ions are split off on exposure to light have the same effect.

Light-sensitive photographic materials containing, in uniform distribution, catalase-active or peroxidase-active ferments such as catalase, peroxidase, haemoglobin or haemin, that are deactivated imagewise by exposure to actinic light, can also be used for the aforementioned processes. Direct-positive images are obtained with materials of this kind.

Although the photographic images obtained by the aforementioned processes are of high quality, it is desirable to shorten the processing time and, more particularly, to accelerate the dye-forming oxidation reaction.

It is among the objects of the present invention to modify the aforementioned photographic process in such a way that the entire processing time is shortened.

We have now found a process for the production of photographic images by the foregoing technique in which the peroxy compound is in an aqueous solution containing at least 0.1% by weight of an organic compound having at least one aliphatic hydroxyl group and/or an aliphatic or aromatic ketone.

Secondary or tertiary aliphatic alcohols with 1 to 3 hydroxy groups, aliphatic ketones which in particular contain up to 6 carbon atoms, or ketones of the phenyl series, are preferred. So-called keto alcohols, i.e. compounds containing an alcoholic hydroxyl group and a keto group in a single molecule, can be used with particular advantage. The alcohols or ketones can also contain further substituents, for example halogens such as fluorine, chlorine or bromine; carboxy groups, alkoxy groups, aryloxy groups, phenyl radicals or heterocyclic radicals. The concentration of the alcohols or ketones can be varied within wide limits. It is governed by the effectiveness of this compound upon the dye-forming oxidation reaction system. The concentrations best suited to the particular system can be determined by a few simple small-scale tests. Concentrations of from 0.1 to 80% by weight, preferably from 1 to 50% by weight based on the total weight of the bath, have generally proved to be adequate.

The velocity of the dye-forming oxidation reaction is very considerably increased by using peroxidic solutions of this kind. When the alcoholic compound alone is used as the organic component in the solution of the peroxide, the accelerating effect of the solution increases during storage. The corresponding ketone is apparently gradually formed in the alcoholic solution, up to the redox equilibrium, during storage under the oxidizing effect of the peroxidic compound. The maximum accelerating effect is actually obtained during preparation of the solutions by using a mixture of alcohols and ketones.

The following compounds, for example, are suitable:

(I) ALCOHOLS

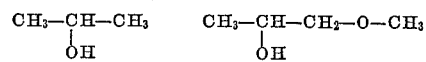

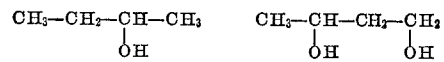

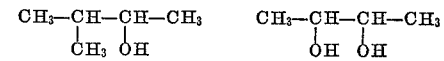

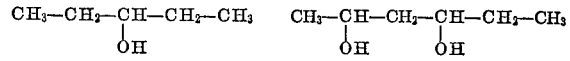

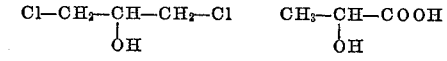

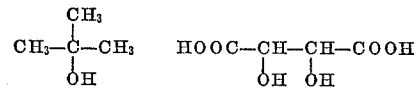

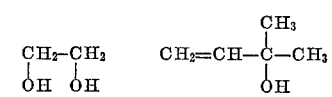

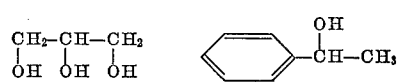

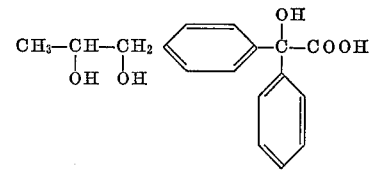

(I) Alcohols—Continued

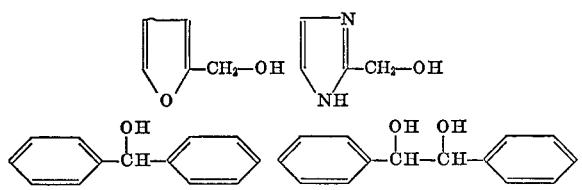

(II) KETONES

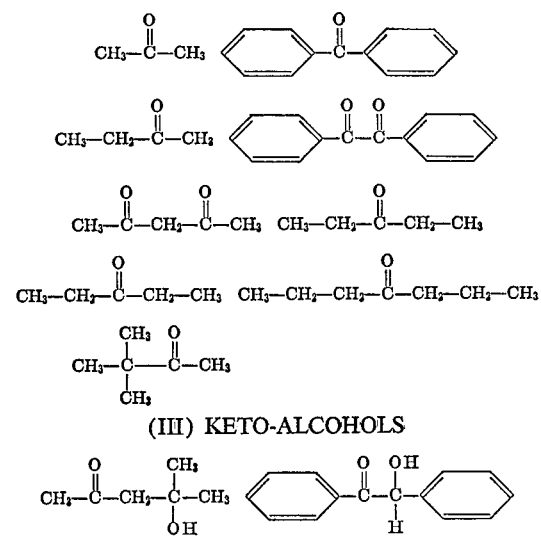

(III) KETO-ALCOHOLS

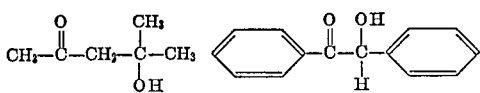

The heterocyclic rings or phenyl groups in the aforementioned compounds can contain further substituents, more particularly hydroxy, alkoxy with preferably up to 5 carbon atoms, sulfocarboxyl, and the like.

The aforementioned alcohols or ketones are known per se and can be produced by methods described in the relevant literature.

The photographic images can be produced in many different ways by known methods. Thus, it does not really matter how imagewise decomposition of the peroxy compound is achieved. It is preferred to use layers which, on imagewise exposure form image nuclei from noble metals of Groups Ib and VIII of the Periodic Table which in turn catalytically accelerate decomposition of the peroxy compound. Photographic materials of this kind are described in German Offenlegungsschrift Nr. 1,813,920 or U.S. Pat. 3,674,490 granted July 4, 1972.

Another useful method of decomposing peroxy compounds to form images is described in German Offenlegungsschrift Nr. 1,950,102, U.S. application Ser. No. 74,482 filed Sept. 22, 1970 or Canadian Pat. No. 790,648. This method relates to a light-sensitive material containing compounds which, on exposure to light, form catalase-active and/or peroxidase-active catalysts. The light sensitive compounds in question are complex compounds of metals of Group VIb, VIIb or VIII of the Periodic Table. A similar material is described in German Offenlegungsschrift Nr. 1,961,029 or U.S. application Ser. No. 94,573 filed Dec. 2, 1970, where the light-sensitive layer contains a compound which, on exposure to light, generates catalase-active or peroxidase-active iodine ions.

Another possible procedure is described in German Offenlegungsschrift Nr. 1,955,901 or U.S. application Ser. No. 84,195 filed Oct. 26, 1970. This procedure enables direct-positive images to be produced. The light-sensitive layer contains catalase-active and/or peroxidase-active ferments which are deactivated on exposure to light. It is subsequently treated with hydrogen peroxide in such a way that decomposition only takes place at those areas which were unaffected by light.

The type of peroxy compound used is not critical. For example, it is possible to use inorganic peroxidic compounds such as perborates, percarbonates, persilicates, perphosphates or persulfate. Organic peroxidic compounds, for example benzoyl peroxide, can also be used. Hydrogen peroxide is particularly suitable because of its effectiveness and because it is easy to handle in aqueous solution. Addition compounds of hydrogen peroxide with organic compounds, more particularly with acid amides such as urea, polyhydroxy compounds or amines, can also be used with advantage.

Treatment with the peroxy compound is carried out in the presence of reaction components which, under oxidizing conditions, give extremely deep-colored compounds so that the hitherto invisible or substantially invisible image becomes visible.

The reaction component can be organic compounds which, during oxidation, yield the image dyestuff, for example amino, hydroxy or aminohydroxy derivatives of isocyclic or heterocyclic aromatic compounds.

The following are mentioned by way of example: phenol, aniline, pyrocatechol, resorcinol, hydroquinone, o-, m- and p-phenylene diamine, N,N-dimethyl phenylene diamine, N,N-diethyl phenylene diamine, N-ethyl-N-methyl phenylene diamine, o-, m- and p-aminophenol, p-methylaminophenol, 2,4-diamino-1-phenol, 2,3-dihydroxy naphthalene, 1,6,7-trihydroxy naphthalene, 1,2-diamino-naphthalene, 1,8-diaminonaphthalene, benzidine, 2,2′-dihydroxy benzidine, diphenylamine, 8-hydroxyquinoline, 5-hydroxyquinoline, 2-hydroxy carbazole, and 1-phenyl-3-pyrazolone.

The amino, hydroxy or aminohydroxy compounds can also be substituted, for example with alkyl, alkylene, aryl, alkoxy, aryloxy, halogen, sulfo, nitro, keto, aldehyde, carboxyl or carbamoyl. The following are examples of such substituted compounds: 2,5-dichloro-p-phenylene diamine, 1-hydroxy-2-aminobenzene - 4 - sulfonic acid, 1-amino-2-hydroxybenzene-4-sulfonic acid, 3-amino-5-sulfosalicylic acid, 1,6,7-trihydroxy naphthalene-3-sulfonic acid, benzidine-2,2′-disulfonic acid, benzidine-3,3′-disulfonic acid, 1,8-dihydroxy naphthalene - 3,6 - disulfonic acid, and 4-nitropyrocatechol.

In some instances, mixtures of several of these compounds actually show much more intense dye formation than the individual components during oxidation. For example, a mixture of o-phenylene diamine and pyrocatechol promotes intense dye formation. Even components which, on their own, do not give any dyes during oxidation, for example, tetrabromo hydroquinone or tetrabromopyrocatechol, can enhance dye formation when added to other hydroxy, amino or aminohydroxy compounds.

A combination of several of these compounds often affords other advantages as well: for example, a combination of p-phenylene derivatives with 1,2-, 1,3- and/or 1,4-dihydroxybenzene gives more neutral black dye than the individual components.

Oxidation of the aromatic amino, hydroxy and/or aminohydroxy compounds is accompanied by the formation of monomeric or polymeric dyestuffs which are related to the quinonimines and azines. A few examples of this oxidative dye-formation are described in H. R. Schweizer, "Künstliche organische Farbstoffe und ihre Zwischenprodukte," Springer-Verlag Berlin-Göttingen-Heidelberg (1964), pp. 222, 275, 281 and 293; N. I. Woroshow, "Grundlagen der Synthese von Zwischenprodukten und Farbstoffen," Akademie-Verlage Berlin (1966), pp. 703 to 789 and A. Schaeffer, "Chemie der Farbstoffe und deren Anwendung" (Technische Fortschrittsberichte, vol. 60), Theodor-Steinkopff-Verlag Dresden-Leipzig (1963), pp. 59 et seq.

In addition to dye intermediates it is of course also possible to use leucodye compounds and vat dyes which can be oxidized into dyestuffs. Examples of compounds such as these can be found on pp. 250 and 320 of the H. R. Schweizer text.

Oxidizable organic compounds of the kind that only give the image in a secondary reaction with other compounds are also suitable for the process of the present invention. In principle, any reaction systems which give dyes through oxidative coupling can be used. Reference is made in particular to the so-called color-producing photographic developers of the phenylene diamine or aminopyrazolone series (cf. for example C. E. K. Mees and T. H. James, "The Theory of the Photographic Process," 3rd edition, MacMillan Co., New York (1966), p. 382 and p. 295 of the H. R. Schweizer text. Isocyclic and heterocyclic hydrazines can also be coupled by oxidation with suitable components to give dyestuffs (cf. for example H. Hünig et al., Angewandte Chemie, 70 (1958), 215 and S. Hünig, Chimia, 15 (1961), 133 and Angewandte Chemie, 74 (1962), 818.

The color-forming photographic developer substances are catalytically oxidized by the peroxy compounds on the imagewise distributed noble metal nuclei or noble metal particles. Their oxidation products can then be reacted according to common practice with photographic color couplers known per se that are also present, to form dye. Any color couplers can be used for this purpose, for example those of the phenol or naphthol series as cyan color couplers, those of the indazolon or pyrazolone series as magenta couplers, and those of the benzoyl acetanilide series as yellow color couplers.

EXAMPLE 1

A highly sensitive silver bromide/iodide gelatin emulsion (4.5 mol percent of AgI) is cast on to a support of polyethylene terephthalate. The dried layer has a thickness of approximately $5\mu$ and contains 1.2 g. of silver in the form of silver halide per m.$^2$. A gelatin protective layer (thickness $8\mu$) is then applied onto the silver halide emulsion layer. The film combination is then hardened in the usual way by treatment with an aqueous solution of formalin or mucochloric acid.

After imagewise exposure (0.5 second with X-rays between fluorescence intensifying foils), the film is initially immersed for 10 seconds at 35° C. in the following developer solution:

Bath I 2 g. of 1-phenyl-3-pyrazolidone
25 g. of hydroquinone
100 g. of $Na_2SO_3$ sicc. and
1 g. of a polyethylene wax made up to 1 litre with water and
adjusted to pH 11.5 with NaOH.

After brief intermediate rinsing, the layer is immersed for 10 seconds at 35° C. in the following mixture:

Bath II 700 cc. of 30% by weight aqueous $H_2O_2$ and
300 cc. of water.

The layer is then treated for 10 seconds at 35° C. with

Bath III 20 g. of 2-amino-5-(N-ethyl-N-ethoxyamino)-toluene
16 g. of pyrocatechol
10 g. of sodium sulfite and
10 g. of sodium citrate
made up to 1 litre with water and
adjusted to pH 8 with $Na_2CO_3$ solution.

In this bath, a black negative dye image is formed.

For stabilizing and fixing, the layer is finally immersed for 10 seconds at 25° C. in a solution of

Bath IV 100 g. of $Na_2S_2O_3$ and
10 ml. of 30% by weight aqueous $NH_3$
in 1 litre of water.

The layer is finally washed for 10 seconds by spraying water on it, and dried.

The color density of the dye image can be increased by briefly heating the layer between Bath II and Bath III (for example by infra-red radiation for 10 seconds at 80° C.). In spite of this, however, the color density in the maximum density range still generally remains below d.=1 in view of these short processing times (10 seconds per bath).

If 300 cc. of isopropanol are added to Bath II instead of the water, the color density in the maximum density range rises to values of the order of d.=2. In other words, about twice as much dye is produced within the extremely short processing time by the addition of isopropanol.

A further increase of 10 to 50% in the rate at which the dye is formed is obtained by the further addition of 5 cc. of acetone to Bath II. This further increase in the dye-forming rate is also obtained by storing Bath II, in which case some of the isopropanol is evidently oxidized into the ketone.

The alcohols and ketones listed in Tables I, II and III above show similar accelerating effects. The optimum alcohol and ketone concentrations and mixtures can readily be determined in each instance by trial and error.

EXAMPLE 2

Preparation of the light-sensitive material 20 g. of green ammonium ferricitrate are dissolved in 80 cc. of water, 6 g. of ammonium ferrioxalate are dissolved in 60 cc. of water, 5 g. of $K_3Fe(CN)_6$ are dissolved in 50 cc. of water, 1 g. of citric acid is dissolved in 10 cc. of water and 12 g. of gelatin are dissolved in 200 cc. of water.

The above solutions are mixed together in red darkroom light and the resulting mixture is applied onto a support of cellulose triacetate. The dried layer is 10 to $20\mu$ thick. It is hardened in the usual way with aqueous solutions of formalin or mucochloric acid.

Processing

The dried layer is exposed through a grey step wedge in a conventional sensitometer (100 watt lamp, 10 seconds exposure). The layer is then exposed for 10 to 20 seconds to an atmosphere of water vapour with a temperature of approximately 80° C., after which it is rinsed for 30 seconds by spraying water onto it.

Thereafter the layer is treated for 30 seconds in Bath I of the following composition:

Bath I 500 ml. of 30% by weight aqueous $H_2O_2$ and
500 ml. of water.

This is followed by treatment for 30 seconds with

Bath II 16 g. of (N,N-diethyl)-p-phenylene diamine sulfate
20 g. of resorcinol and
9 g. of sodium sulfite
made up to 1 litre with water and
adjusted to pH 9.5 with $K_2CO_3$.

Finally, the layer is washed intensively for 30 seconds by spraying water on it, and then dried. A black negative dye image of the original is obtained.

Despite this quick processing, the color densities of this dye image can be increased by 20 to 50% by the addition of 500 cc. of a saturated aqueous solution of 1-phenyl-ethyl alcohol instead of water to Bath I. The color density can be increased by another 50% by the further addition of 50 g. of the sodium salt of benzilic acid.

EXAMPLE 3

A transparent support of cellulose triacetate is coated with a solution containing, in 400 cc. of water, 6 ml. of a 10% by weight aqueous solution of polyvinyl alcohol, 2 g. of $TiO_2$ with a particle size of from 0.3 to $0.4\mu$, and 0.1 mg. of erythrosin as spectral sensitizer. The layer is then dried.

The dried layer is exposed imagewise and then treated for 30 seconds at 30° C. with Bath I 2% by weight aqueous $Na_2Pd(C_2O_4)_2$-solution.

After brief intermediate rinsing, the layer is immersed for 30 seconds at 20° C. in a solution of Bath II 500 ml. of 30% by weight aqueous $H_2O_2$ and 500 ml. of water.

The layer is then treated for 30 seconds at 20° C. with the following bath to promote dye formation.

Bath III 10 g. of 2,4-diaminophenol
50 g. of pyrocatechol and
9 g. of $Na_2SO_3$ sicc.
made up to 1 litre with water and
adjusted to pH 8 with $Na_2CO_3$.

Finally, the layer is washed for 30 seconds by spraying water on it, and dried. A black negative image of the original is obtained.

If a mixture of 450 cc. of butane-2,3-diol, 40 cc. of glycerin and 10 cc. of ethyl methyl ketone is added to Bath II instead of the 500 cc. of water, the color density of the image obtained in this short processing time is increased by 50%.

What is claimed is:

1. In the process for the production of photographic images by imagewise exposing a light-sensitive layer to imagewise produce substances which catalytically decompose peroxy compounds, treating the exposed layer with a catalytically decomposable peroxy compound in the presence of dye-forming material that imagewise produces a dye where the peroxy compound is decomposed, the improvement according to which the treatment is also in the presence of dye-intensifying material selected from the class consisting of secondary or tertiary aliphatic alcohols with up to 3 hydroxy groups and up to 6 carbons, aliphatic ketones with up to 6 carbon atoms, and phenyl ketones, in a quantity that increases the color density of the image produced when using very short processing times.

2. The combination of claim 1 in which the dye-intensifying material is a secondary or tertiary aliphatic alcohol having only one hydroxy group.

3. The combination of claim 1 in which the dye-intensifying material is a mixture of alcohols and ketones.

4. The combination of claim 1 in which the dye-intensifying material is a mixture of a secondary alcohol and its corresponding ketone.

References Cited

UNITED STATES PATENTS

| 3,674,490 | 7/1972 | Matejec | 96—48 R |
|---|---|---|---|
| 2,945,761 | 7/1960 | Weissberger | 96—55 |
| 2,384,663 | 9/1945 | Weissberger et al. | 96—56 |
| 3,615,503 | 10/1971 | Edens, et al. | 96—55 |

OTHER REFERENCES

Photographic Image Prodn. in Presence of Substances Forming Catalysts With Catalase or Peroxidase Activity, Central Patents Index, Derwent Publications Ltd., England, Week S13, May 28, 1971.

NORMAN G. TORCHIN, Primary Examiner

W. H. LOUIE, JR., Assistant Examiner

U.S. Cl. X.R.

96—49, 55